(12) United States Patent
Amundson et al.

(10) Patent No.: US 7,225,054 B2
(45) Date of Patent: May 29, 2007

(54) CONTROLLER WITH PROGRAMMABLE SERVICE EVENT DISPLAY MODE

(75) Inventors: John B. Amundson, Plymouth, MN (US); Marcus D. Stoner, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 295 days.

(21) Appl. No.: 10/726,243

(22) Filed: Dec. 2, 2003

(65) Prior Publication Data

US 2005/0119794 A1    Jun. 2, 2005

(51) Int. Cl.
G05D 3/12 (2006.01)
G05B 19/42 (2006.01)
G05B 11/01 (2006.01)

(52) U.S. Cl. .................. 700/276; 700/86; 700/17

(58) Field of Classification Search ............ 700/276, 700/86, 17, 83, 296; 165/238, 239, 289; 236/91 F, 99 E See application file for complete search history.

(56) References Cited

U.S. PATENT DOCUMENTS

| | | |
|---|---|---|
| 4,079,366 A | 3/1978 | Wong |
| 4,174,807 A | 11/1979 | Smith et al. |
| 4,206,872 A | 6/1980 | Levine |
| 4,224,615 A | 9/1980 | Penz |
| 4,264,034 A | 4/1981 | Hyltin et al. |
| 4,298,946 A | 11/1981 | Hartsell et al. |
| 4,308,991 A | 1/1982 | Peinetti et al. |
| 4,337,822 A | 7/1982 | Hyltin et al. |
| 4,382,544 A | 5/1983 | Stewart |
| 4,386,649 A | 6/1983 | Hines et al. |
| 4,388,692 A | 6/1983 | Jones et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,506,827 A | 3/1985 | Jamieson et al. |
| 4,606,401 A | 8/1986 | Levine et al. |
| 4,621,336 A | 11/1986 | Brown |
| 4,622,544 A | 11/1986 | Bially et al. |
| 4,717,333 A | 1/1988 | Carignan |
| 4,725,001 A | 2/1988 | Carney et al. |

(Continued)

FOREIGN PATENT DOCUMENTS

DE    3334117.6    4/1985

(Continued)

OTHER PUBLICATIONS

Carrier, "Programmable Dual Fuel Thermostat," Installation, Start-Up & Operating Instructions, pp. 1-12, Oct. 1998.

(Continued)

Primary Examiner—Thomas K. Pham

(57) ABSTRACT

Controllers and systems for displaying servicing information via a display unit are disclosed. A controller in accordance with an illustrative embodiment of the present invention may include an interface for programming a service event display mode in the controller, and a display unit configured to display servicing information when a service event is detected by the controller. An event such as the triggering of a service indicator or the expiration of an equipment service event timer may cause the controller to display servicing information on the display unit, informing the user that servicing may be necessary or is recommended.

40 Claims, 10 Drawing Sheets

U.S. PATENT DOCUMENTS

| | | | |
|---|---|---|---|
| 4,819,714 A * | 4/1989 | Otsuka et al. | 165/217 |
| 4,837,731 A | 6/1989 | Levine et al. | |
| 4,881,686 A | 11/1989 | Mehta | |
| 4,918,439 A | 4/1990 | Wozniak et al. | |
| 4,948,040 A * | 8/1990 | Kobayashi et al. | 236/49.3 |
| 4,992,779 A | 2/1991 | Sugino et al. | |
| 4,997,029 A | 3/1991 | Otsuka et al. | |
| 5,012,973 A | 5/1991 | Dick et al. | |
| 5,038,851 A | 8/1991 | Mehta | |
| 5,053,752 A | 10/1991 | Epstein et al. | |
| 5,065,813 A | 11/1991 | Berkeley et al. | |
| 5,086,385 A | 2/1992 | Launey et al. | |
| 5,088,645 A | 2/1992 | Bell | |
| 5,140,310 A | 8/1992 | DeLuca et al. | |
| 5,161,606 A | 11/1992 | Berkeley et al. | |
| 5,170,935 A | 12/1992 | Federspiel et al. | |
| 5,181,653 A | 1/1993 | Foster et al. | |
| 5,230,482 A | 7/1993 | Ratz et al. | |
| 5,238,184 A | 8/1993 | Adams | |
| 5,251,813 A | 10/1993 | Kniepkamp | |
| 5,259,445 A | 11/1993 | Pratt et al. | |
| 5,329,991 A | 7/1994 | Mehta et al. | |
| 5,348,078 A | 9/1994 | Dushane et al. | |
| 5,386,577 A | 1/1995 | Zenda | |
| 5,395,042 A | 3/1995 | Riley et al. | |
| 5,482,209 A | 1/1996 | Cochran et al. | |
| 5,526,422 A | 6/1996 | Keen | |
| 5,537,106 A | 7/1996 | Mitcuhashi | |
| 5,566,879 A | 10/1996 | Longtin | |
| 5,570,837 A | 11/1996 | Brown et al. | |
| 5,673,850 A | 10/1997 | Uptegraph | |
| 5,682,206 A | 10/1997 | Wehmeyer et al. | |
| 5,782,296 A | 7/1998 | Mehta | |
| 5,818,428 A | 10/1998 | Eisenbrandt et al. | |
| 5,841,112 A * | 11/1998 | Brooks et al. | 219/506 |
| 5,873,519 A | 2/1999 | Beilfuss | |
| 5,877,957 A * | 3/1999 | Bennett | 700/86 |
| 5,886,697 A | 3/1999 | Naughton et al. | |
| 5,901,183 A | 5/1999 | Garin et al. | |
| 5,902,183 A | 5/1999 | D'Souza | |
| 5,937,942 A | 8/1999 | Bias et al. | |
| 5,947,372 A | 9/1999 | Tiernan | |
| 6,020,881 A | 2/2000 | Naughton et al. | |
| 6,032,867 A | 3/2000 | Dushane et al. | |
| 6,059,195 A | 5/2000 | Adams et al. | |
| 6,064,310 A | 5/2000 | Busak et al. | |
| 6,081,197 A | 6/2000 | Garrick et al. | |
| 6,121,875 A | 9/2000 | Hamm et al. | |
| 6,140,987 A | 10/2000 | Stein et al. | |
| 6,192,282 B1 | 2/2001 | Smith et al. | |
| 6,196,467 B1 | 3/2001 | Dushane et al. | |
| 6,208,331 B1 | 3/2001 | Singh et al. | |
| 6,236,326 B1 | 5/2001 | Murphy | |
| 6,285,912 B1 | 9/2001 | Ellison et al. | |
| 6,290,140 B1 | 9/2001 | Pesko et al. | |
| 6,315,211 B1 | 11/2001 | Sartain et al. | |
| 6,318,639 B1 | 11/2001 | Toth | |
| 6,330,806 B1 | 12/2001 | Beaverson et al. | |
| 6,344,861 B1 | 2/2002 | Naughton et al. | |
| 6,351,693 B1 | 2/2002 | Monie et al. | |
| 6,398,118 B1 | 6/2002 | Rosen et al. | |
| 6,466,132 B1 | 10/2002 | Caronna et al. | |
| 6,478,233 B1 | 11/2002 | Shah | |
| 6,502,758 B2 | 1/2003 | Cottrell | |
| 6,518,957 B1 | 2/2003 | Lehtinen et al. | |
| 6,578,770 B1 | 6/2003 | Rosen | |
| 6,580,950 B1 | 6/2003 | Johnson et al. | |
| 6,581,846 B1 | 6/2003 | Rosen | |
| 6,595,430 B1 | 7/2003 | Shah | |
| 6,608,560 B2 * | 8/2003 | Abrams | 340/539.14 |
| 6,619,555 B2 | 9/2003 | Rosen | |
| 6,621,507 B1 | 9/2003 | Shah | |
| 6,726,112 B1 * | 4/2004 | Ho | 236/94 |
| 6,741,915 B2 * | 5/2004 | Poth | 700/276 |
| 6,786,421 B2 | 9/2004 | Rosen | |
| 6,789,739 B2 * | 9/2004 | Rosen | 236/51 |
| 6,824,069 B2 * | 11/2004 | Rosen | 236/94 |
| 6,868,293 B1 * | 3/2005 | Schurr et al. | 700/22 |
| 6,967,565 B2 * | 11/2005 | Lingemann | 340/286.02 |
| 2001/0029585 A1 | 10/2001 | Simon et al. | |
| 2001/0042684 A1 | 11/2001 | Essalik et al. | |
| 2001/0052459 A1 | 12/2001 | Essalik et al. | |
| 2002/0005435 A1 | 1/2002 | Cottrell | |
| 2002/0092779 A1 | 7/2002 | Essalik et al. | |
| 2002/0180590 A1 | 12/2002 | Abrams | |
| 2003/0034897 A1 | 2/2003 | Shamoon et al. | |
| 2003/0034898 A1 | 2/2003 | Shamoon et al. | |
| 2003/0121652 A1 | 7/2003 | Carey et al. | |
| 2003/0123224 A1 | 7/2003 | LaCroix et al. | |
| 2003/0136135 A1 | 7/2003 | Kim et al. | |
| 2003/0142121 A1 | 7/2003 | Rosen | |
| 2003/0150926 A1 | 8/2003 | Rosen | |
| 2003/0150927 A1 | 8/2003 | Rosen | |
| 2003/0195640 A1 * | 10/2003 | Krocker et al. | 700/26 |
| 2004/0074978 A1 | 4/2004 | Rosen | |
| 2004/0193324 A1 * | 9/2004 | Hoog et al. | 700/276 |
| 2004/0245352 A1 | 12/2004 | Smith | |
| 2005/0103875 A1 * | 5/2005 | Ashworth et al. | 236/94 |

FOREIGN PATENT DOCUMENTS

| | | |
|---|---|---|
| EP | 0678204 | 3/2000 |
| EP | 0985994 | 3/2000 |
| EP | 1074009 | 7/2001 |
| JP | 11159846 | 6/1999 |
| WO | WO 97/11448 | 3/1997 |
| WO | WO 97/39392 | 10/1997 |
| WO | WO 01/52515 | 7/2001 |
| WO | WO 01/79952 | 10/2001 |
| WO | WO 01/93779 | 12/2001 |

OTHER PUBLICATIONS

Carrier, "Programmable Thermostats," Installation, Start-Up & Operating Instructions, pp. 1-16, Sep. 1998.

Carrier, "Standard Programmable Thermostat," Homeowner's Manual, pp. 1-8 pages, 1998.

Carrier, "Thermidistat Control," Installation, Start-Up, and Operating Instructions, pp. 1-12, Aug. 1999.

CorAccess, "Companion 6," User Guide, pp. 1-20, Jun. 17, 2002.

http://www.thermostatsales.com, Robertshaw, "9610 Digital Programmable Thermostat," 3 pages, printed Jun. 17, 2004.

http://www.thermostatsales.com, Robertshaw, "9700 Deluxe Programmable Thermostat" 3 pages, printed Jun. 17, 2004.

http://www.thermostatsales.com, Robertshaw, "9710 Deluxe Programmable Thermostat," 3 pages, printed Jun. 17, 2004.

http://www.thermostatsales.com, Robertshaw, "9720 Deluxe Programmable Thermostat," 3 pages, printed Jun. 17, 2004.

Metasys, "HVAC Pro for Windows User's Manual," 308 pages, 1998.

http://www.ritetemp.info/rtMenu_13.html, Rite Temp 8082, 8 pages, printed Jun. 20, 2003.

Totaline, "1 For All programmable Digital Thermostat," Owner's Manual P/N P374-1100FM, 23 pages, Nov. 1998.

Totaline, "1 For All Programmable Digital Thermostat," Owner's Manual P/N P474-1050, 21 pages, Nov. 1998.

Totaline, "1 For All Programmable Digital Thermostat," Owner's Manual P/N P374-110, 24 pages, Apr. 2001.

Totaline, "Intellistat Combination Temperature and Humidity Control," Owner's Manual P/N P374-1600, 25 pages, Jun. 2001.

Totaline, "Programmable Thermostat Configurable for Advanced Heat Pump or Dual Fuel Operation," Owner's Manual P/N P374-1500, 24 pages, Jun. 1999.

Totaline, "Instructions P/N P474-1010", Manual, 2 pages, Dec. 1998.

Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
Braeburn Model 3000 Owner's Manual, pp. 1-13, 2001.
Braeburn Model 5000 Owners Manual, pp. 1-17, 2001.
BRK First Alert, User's Manual, Smoke and Fire Alarms, pp. 1-7, Nov. 2002.
Carrier Microelectronic Programmable Thermostat Owner's Manual, pp. 1-24, May 1994.
Danfoss RT51/51RF & RT52/52RF User Instructions, 2 pages, Jun. 2004.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, MagicStat® CT3200 Programmable Thermostat, Installation and Programming Instructions, pp. 1-24, 2001.
Ritetemp Operation 8029, 3 pages, Jun. 19, 2002.
Ritetemp Operation 8050, 5 pages, Jun. 26, 2002.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 5 pages, May 2001; First Sale Feb. 2001.
Business Wire, "MicroTouch Specialty Products Group to Capitalize on Growing Market for Low-Cost Digital Matrix Touchscreens," p. 1174 (2 pages), Jan. 6, 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
DeKoven et al., "Designing Collaboration in Consumer Products," 2 pages, 2001.
Freudenthal et al., "Communicating extensive smart home functionality to user of all ages: the design of a mixed-initiative multimodal thermostat-interface," pp. 34-39, Mar. 12-13, 2001.
Honeywell News Release, "Honeywell's New Sysnet Facilities Integration System For Boiler Plant and Combustion Safety Processes," 4 pages, Dec. 15, 1995.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
"Mark of Excellence Award Finalist Announced," http://64.233.167104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Product Review—Philips Pronto Remote Control," http://hometheaterhifi.com/volume_6_2/philipsprontoremotecontrol.html, 5 pages, dated May 1999, printed Aug. 20, 2004.
"CorAccess Systems/In Home," http://web.archive.org/web20011212084427/www.coraccess.com/home.html, 1 page, copyright 2001, printed Aug. 19, 2004.
"A Full Range of Alternative User Interfaces For Building Occupants and Operators," http://www.automatedbuildings.com/news/jan00/articles/andover/andover.htm, 5 pages, dated Jan. 2000, printed Sep. 20, 2004.
http://www.cc.gatech.edu/computing/classes/cs6751_94_fall/groupc/climate-2/nodel.html, "Contents," 53 pages, printed Sep. 20, 2004.
"HAI Company Background," http://www.homeauto.com/AboutHAI/abouthai_main.htm, 2 pages, printed Aug. 19, 2004.
Cardio, by Secant; http://www.hometoys.com/htinews/apr98/reviews/cardio.htm, "HTINews Review," Feb. 1998, 5 pages, printed Sep. 14, 2004.
Cardio Manual, available at http://www.secant.ca/En/Documentation/Cardio2é-Manual.pdf, Cardio Home Automation Inc., 55 pages, printed Sep. 28, 2004.
Domotique Secant Home Automation—Web Page, available at http://www.secant.ca/En/Company/Default.asp, 1 page, printed Sep. 28, 2004.
"Vantage Expands Controls For Audio/Video, HVAC and Security," http://www.hometoys.com/htinews/aug99/releases/vantage03.htm, 2 pages, dated Aug. 3, 1999, printed Aug. 20, 2004.
Visor Handheld User Guide, Copyright 1999-2000.
"Home Toys Review—TouchLinc", http://www.hometoys.com/htinews/aug99/reviews/touchline/touchlinc.htm, 3 pages, dated Aug. 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
Blake et al., "Seng 310 Final Project" Report, dated Apr. 6, 2001.
Blake et al., "Seng 310 Final Project Demo Program" Illustration, 3 pages, Apr. 6, 2001.
"Spotlight on integrated systems," Custom Builder, V8, N2, p. 66(6), Mar.-Apr. 1993.
AutomatedBuildings.com Article—"Thin Client" Solutions, "Pressure, Air Flow, Temperature, Humidity & Valves," Dwyer Instruments, Inc., 5 pages, printed Sep. 20, 2004.
ADT Security Systems, "iCenter Advanced User Interface 8142ADT User Guide," pp. 1-136, 2001.
DeKoven et al., "Measuring Task Models in Designing Intelligent Products," pp. 188-189, 2002.
http://www.hometoys.com/htinews/apr99/releases/hal01.htm, HTI News Release, pp. 1-3, printed Oct. 28, 2004.
U.S. Appl. No. 10/440,474, filed May 15, 2003, entitled "Reverse Images in a Dot Matrix LCD for an Environmental Control Device."
U.S. Appl. No. 10/654,230, filed Sep. 3, 2003, entitled "Programmable Thermostat Incorporating a Liquid Crystal Display and Having a Feature for Mounting Horizontally, Vertically and any Intermediate Orientation."
U.S. Appl. No. 10/654,235, filed Sep. 3, 2003, entitled "Programmable Thermostat Incorporating a Liquid Crystal Display Selectively Presenting Adaptable System Menus Including Changeable Interactive Virtual Buttons."
Aprilaire Electronic Thermostats Models 8344, 8346, 8348, 8363, 8365, 8366 Operating Instructions, 8 pages, prior to Dec. 2, 2003.
BRK Electronics Maximum Protection Plus Ultimate Convenience Smoke Alarm, 24 pages, prior to Dec. 2, 2003.
Carrier TSTATCCRF01 Programmable Digital Thermostat, pp. 1-21, prior to Dec. 2, 2003.
Firex Smoke Alarm, Ionization Models AD, ADC Photoelectric Model Pad, 4 pages, prior to Dec. 2, 2003.

Invensys Deluxe Programmable Thermostats 9700, 9701, 9715, 9720, User's Manual, 21 pages, prior to Dec. 2, 2003.
Lux TX9000 Installation, 3 pages, prior to Dec. 2, 2003.
Ritetemp Operation 8085, pp. 1-6, prior to Dec. 2, 2003.
Sealed Unit Parts Co., Inc., Supco & CTC Thermostats . . . loaded with features, designed for value!, 6 pages, prior to Dec. 2, 2003.
Totaline Model P474-1035 Owner's Manual Programmable 5-2 Day Digital Thermostat, pp. 1-21, prior to Dec. 2, 2003.
Totaline Star P/N P474-0130 Non-Programmable Digital Thermostat Owner's Manual, pp. 1-22, prior to Dec. 2, 2003.
White-Rodgers 1F80-224 Programmable Electronic Digital Thermostat, Installation and Operation Instructions, 8 pages, prior to Dec. 2, 2003.
White-Rodgers Installation Instructions for Heating & Air Conditioning IF78 Non-Programmable Thermostat, 6 pages, prior to Dec. 2, 2003.
White-Rodgers, Comfort-Set 90 Series Premium, 4 pages, prior to Dec. 2, 2003.
Blister Pack Insert from a Ritetemp 8082 Touch Screen Thermostat Product, 2 pages, 2002.
Operation Manual for Ritetemp Touch Screen Thermostat 8082, 8 pages, 2002.
Trouble Shooting Guide for Ritetemp Thermostat 8082, 1 page, 2002.
Quick Start Guide for Ritetemp Thermostat 8082, 1 page, 2002.
Install Guide for Ritetemp Thermostat 8082, 6 pages, 2002.
Remote Control Power Requirement for Ritetemp Thermostat 8082, 1 page, 2002.
Mounting Template for Ritetemp Thermostat 8082, 1 page, 2002.
Hunter, "44200/44250," Owner's Manual, 32 pages, prior to Dec. 2, 2003.
Hunter, "44300/44350," Owner's Manual, 35 pages, prior to Dec. 2, 2003.
Hunter, "Auto Saver 550", Owner's Manual Model 44550, 44 pages, prior to Dec. 2, 2003.
Invensys™, "9700i 9701i 9715i 9720i Deluxe Programmable Thermostats," User's Manual, pp. 1-28, prior to Dec. 2, 2003.
Lux, "511 Seeries Smart Temp Electronic Thermostat," Owner's Manual, 3 pages, prior to Dec. 2, 2003.
Lux, "600 Series Smart Temp Electronic Thermostat," Owner's Manual, 3 pages, prior to Dec. 2, 2003.
Lux, "602 Series Multi-Stage Programmable Thermostat," Owner's Manual, 2 pages, prior to Dec. 2, 2003.
Lux, "605/2110 Series Programmable Heat Pump Thermostat," Owner's Manual, 3 pages, prior to Dec. 2, 2003.
Lux, "700/9000 Series Smart Temp Electronic Thermostat," Owner's Manual, 3 pages, prior to Dec. 2, 2003.
Lux, "PSPH521 Series Programmable Heat Pump Thermostat," Owner's Manual, 3 pages, prior to Dec. 2, 2003.
Lux, "TX1500 Series Smart Temp Electronic Thermostat," Owner's Manual, 6 pages, prior to Dec. 2, 2003.
Lux, "TX500 Series Smart Temp Electronic Thermostat," Owner's Manual, 3 pages, prior to Dec. 2, 2003.
Lux, "ELV1 Programmable Line Voltage Thermostat," Owner's Manual, 3 pages, prior to Dec. 2, 2003.
Warmly Yours, "Model TH111GFCI-P (120 VAC)," Manual, pp. 1-4, prior to Dec. 2, 2003.
White-Rodgers, "Installation Instructions for Heating & Air Conditioning IF72 5/2 Day Programmable Heat Pump Thermostat," 8 pages, prior to Dec. 2, 2003.
White-Rodgers, "Installation Instructions for Heating & Air Conditioning IF78 5/2 Day Programmable Thermostat," 7 pages, prior to Dec. 2, 2003.
White-Rodgers, "Comfort-Set 90 Series Thermostat," Manual, pp. 1-24, prior to Dec. 2, 2003.
White-Rodgers, "Comfort-Set III Thermostat," Manual, pp. 1-44, printed prior to filing date.
White-Rodgers, 1F80-240 "(for Heating Only systems) Programmable Electronic Digital Thermostat," Installation and Operation Instructions, 8 pages, prior to Dec. 2, 2003.
White-Rodgers, 1F80-241 "Programmable Electronic Digital Thermostat," Installation and Operation Instructions, 6 pages, prior to Dec. 2, 2003.
White-Rodgers, 1F80-261 "Programmable Electronic Digital Thermostat," Installation and Operation Instructions, 8 pages, prior to Dec. 2, 2003.
White-Rodgers, 1F81-261 "Programmable Electronic Digital Multi-Stage Thermostat," Installation and Operation Instructions, 8 pages, prior to Dec. 2, 2003.
White-Rodgers, 1F82-261 "Programmable Electronic Digital Heat Pump Thermostat," Installation and Operation Instructions, 8 pages, prior to Dec. 2, 2003.
www.icmcontrols.com, Simplecomfort, SC3000 Single Stage Heat/Single Stage Cool or Single Stage Heat Pump/Manual Changeover, 1 page, prior to Dec. 2, 2003.
www.icmcontrols.com, Simplecomfort, SC3001 Single Stage Heat/Single Stage Cool or Single Stage Heat Pump/Manual Changeover, 1 page, prior to Dec. 2, 2003.
www.icmcontrols.com, Simplecomfort, SC3006 Single Stage Heat/Single Stage Cool or Single Stage Heat Pump/Manual Changeover, 1 page, prior to Dec. 2, 2003.
www.icmcontrols.com, Simplecomfort, SC3201 2 Stage Heat Pump Manual Changeover, 1 page, prior to Dec. 2, 2003.
www.icmcontrols.com, Simplecomfort, SC3801 2 Stage Heat/2 Stage Cool 2 Stage Heat Pump/Audio Changeover, 1 page, prior to Dec. 2, 2003.

* cited by examiner

CONTROLLER WITH PROGRAMMABLE SERVICE EVENT DISPLAY MODE

FIELD OF THE INVENTION

The present invention relates generally to the field of programmable controllers for homes and/or buildings and their related grounds. More specifically, the present invention relates to such controllers having a programmable service event display mode.

BACKGROUND OF THE INVENTION

Controllers are used on a wide variety of devices and systems for controlling various functions in homes and/or buildings and their related grounds. Some controllers have schedule programming that modifies device parameters such as set points as a function of date and/or time. Some such device or system controllers that utilize schedule programming for controlling various functions in homes and/or buildings and their related grounds include, for example, HVAC controllers, water heater controllers, water softener controllers, security system controllers, lawn sprinkler controllers, and lighting system controllers.

In a typical HVAC system, for example, such controllers can be employed to monitor and, if necessary, control various environmental conditions occurring within a structure. The controller may include a microprocessor that interacts with other components in the system via an I/O interface to regulate the temperature, humidity, venting, and air quality occurring at one or more locations within the structure. An internal sensor located within the controller and/or one or more remote sensors may be employed to sense when the temperature or humidity level reaches a certain threshold level, causing the controller to send a signal to activate or deactivate one or more components in the system.

The controller may be configured to detect when a service event has occurred in one or more of the system components. In certain circumstances, for example, the controller may be configured to detect when one or more system components have malfunctioned or gone offline, or have been in service beyond a recommended period of time and thus require maintenance. Depending on the type of service event detected, the controller can be configured to shut down one or more of the components until the system can be restored.

In some cases, the component triggering the service event may require servicing from the manufacturer or other authorized technician in order to restore the system to normal operation. To notify the user where to obtain service, many manufacturers will place a sticker containing servicing information in an inconspicuous place such as on the inside door panel of the controller housing. After a service event has occurred, the user must know to open the controller door in order to obtain the servicing information. Accordingly, there is a need in the art to better provide the user with servicing information when a fault or other service event has been detected.

SUMMARY OF THE INVENTION

The present invention relates to programmable controllers having a programmable service event display mode. A programmable controller in accordance with an illustrative embodiment of the present invention may include an interface for programming a service event display mode in the controller, and/or for displaying servicing information when a service event is detected by the controller. In certain embodiments, the interface may be provided as part of a user interface such as a touch screen or LCD panel/keypad inset within a controller housing. In other embodiments, the interface may be provided as a separate interface from the user interface, allowing the controller to be programmed from a location outside of the controller.

The controller may be operatively coupled to a number of other system components including, for example, a heating unit, a cooling unit, a ventilation unit, a filtration unit, a UV lamp unit, a humidifier/dehumidifier unit, and/or one or more local or remote sensors. The controller can be configured to check the status of the system components to determine if one or more of the components is functioning properly, has malfunctioned, or has gone offline. An event such as the triggering of a service indicator or the expiration of an equipment service event timer may cause the controller to display servicing information on the display unit, informing the user that servicing may be necessary or recommended. Alternatively, or in addition, the controller may be programmed to automatically contact a designated contractor, a service referral organization, a utility, a retailer, a manufacturer, and/or some other person or organization, requesting service for the detected event. In certain embodiments, the user may send a signal to the controller requesting that certain servicing information be displayed on the display unit, and/or that the controller contact a designated contractor, a service referral organization, a utility, a retailer, a manufacturer, and/or some other person or organization, as desired.

DETAILED DESCRIPTION OF THE INVENTION

The following description should be read with reference to the drawings, in which like elements in different drawings are numbered in like fashion. The drawings, which are not necessarily to scale, depict selected embodiments and are not intended to limit the scope of the invention. Although examples of various programming and operational steps are illustrated in the various views, those skilled in the art will recognize that the many of the examples provided have suitable alternatives that can be utilized. While the various devices and systems illustrated herein are described specifically with respect to HVAC systems, it should be understood that the present invention could be employed in other systems, including, for example, security systems, lighting systems, sprinkler or drip water systems, audio/video systems, etc.

Figure 1:
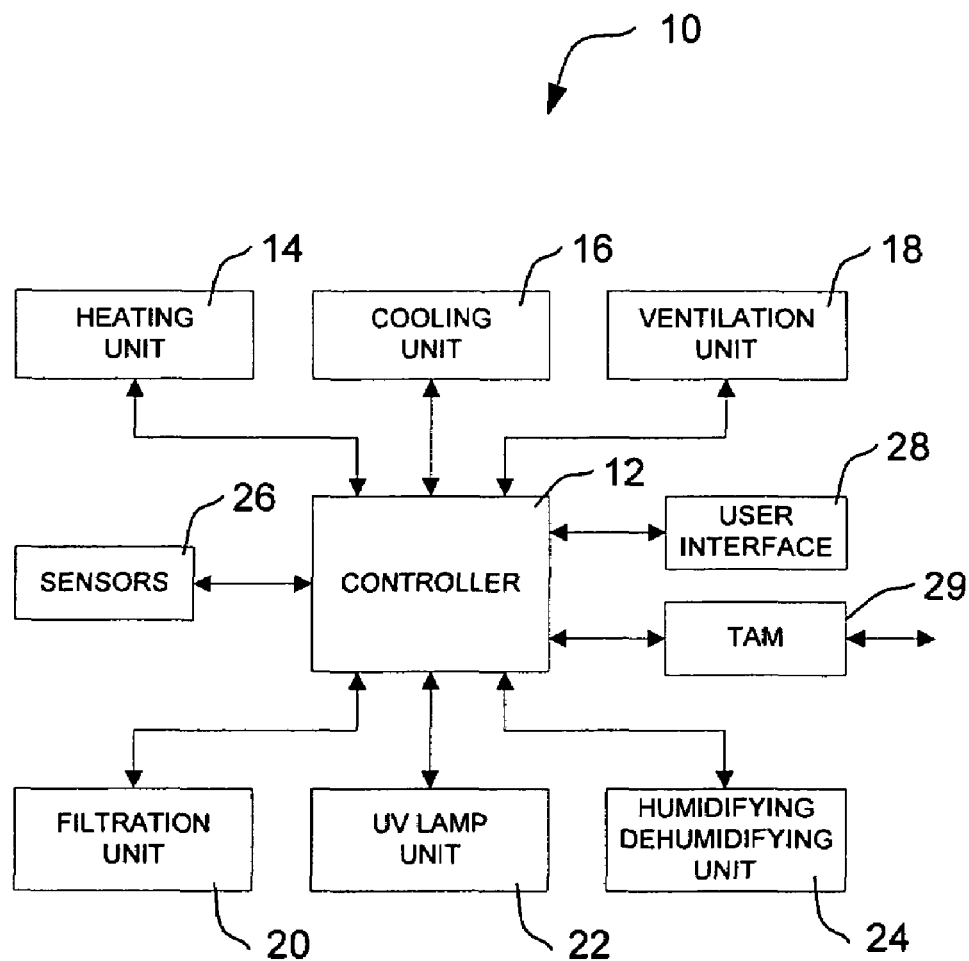
FIG. 1 is a block diagram of an illustrative HVAC system employing a controller having a programmable service event display mode.

Referring now to FIG. 1, a block diagram of an illustrative HVAC system 10 employing a controller 12 having a programmable service event display mode will now be described. Controller 12 may be operatively connected to one or more system components that can be activated to regulate various environmental conditions such as temperature, humidity and air quality levels occurring within a structure. As shown in FIG. 1, for example, the controller 12 can be connected to a heater unit 14 and cooling unit 16 that can be activated to maintain the structure at a particular temperature level. A ventilation unit 18 such as a fan or blower equipped with one or more dampers may be employed to regulate the volume of air delivered to the various rooms of the structure. A filtration unit 20, UV lamp unit 22, and humidifier/dehumidifier unit 24 may also be provided to regulate the air quality and moisture levels within the structure. One or more local and/or remote sensors 26 as well as other system components can also be connected to controller 12 to monitor and regulate the environment, as desired. The system components may be directly connected to a corresponding Input/Output (I/O) port or I/O pins on the controller 12, and/or connected to the controller via a network or the like, as desired.

The controller 12 may include a user interface 28 that allows a user or service technician to transmit signals to and from the controller 12. The user interface 44 can include a touch screen, a liquid crystal display (LCD) panel and keypad, a dot matrix display, a computer, and/or any other suitable device for sending and receiving signals to and from the controller 12. The controller 12 can be configured to display servicing information on the user interface 28 to notify the user when a fault or malfunction has been detected, or when servicing is necessary or desirable. In certain embodiments, for example, the controller 12 can be programmed to display the name, logo, URL and/or telephone number of a designated contractor, a service referral organization, a utility, a retailer, a manufacturer, and/or some other person or organization when a fault or other service event has been detected in one or more of the system components. In some cases, the controller may display a different name, logo, URL and/or telephone number, depending on the nature of the service event detected and/or the component or unit that needs service. For example, the name, logo, URL and/or telephone number of a designated heating contractor may be displayed when a service event related to the heating system is detected, and the name, logo, URL and/or telephone number of a designated security system contractor may be displayed when a service event related to the security system is detected. In some cases, a service event code and/or short description of the service event may be displayed.

As is discussed in greater detail with respect to FIGS. 5-10 below, such servicing information can be displayed prominently on a display unit, providing the user with information on where to call for servicing. Alternatively, or in addition, the controller 12 may be programmed to automatically contact a designated contractor, a service referral organization, a utility, a retailer, a manufacturer, and/or some other person or organization, requesting service for the detected event. In one illustrative embodiment, a Telephone Access Module (TAM) 29 may be provided. The TAM 29 may call the appropriate person or organization when a service event is detected by the controller 12. While a TAM is shown in FIG. 1, it is contemplated that the controller 12 may notify an appropriate person or organization when a service event is detected via an internet connection, a wireless connection (e.g. cell phone), or any other suitable communication method, as desired.

Figure 2:
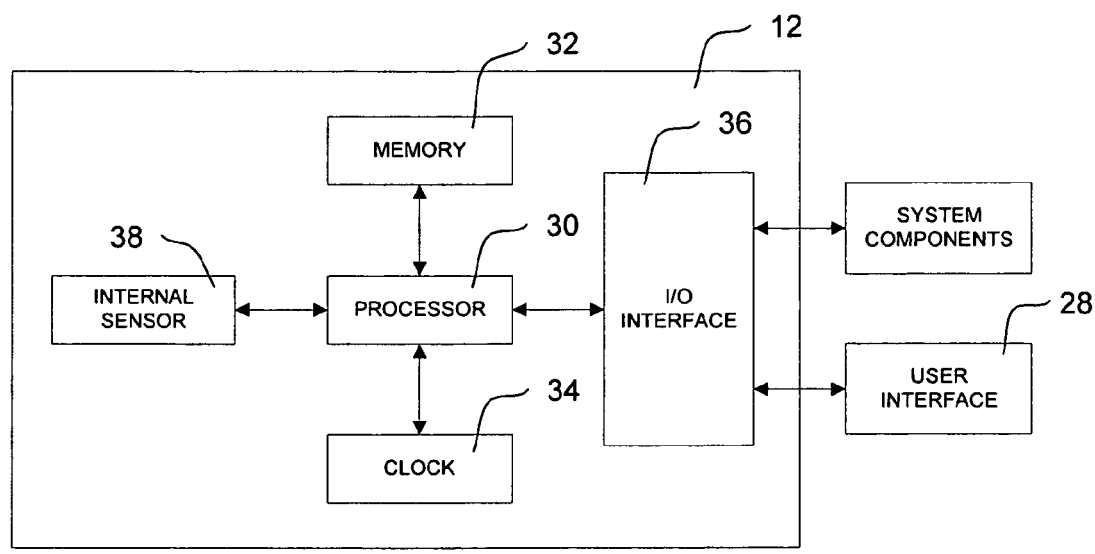
FIG. 2 is a block diagram of the controller and user interface of FIG. 1.

FIG. 2 is a block diagram of the controller 12 and user interface 28 of FIG. 1. As illustrated in FIG. 2, the controller 12 may include a processor 30 (e.g. a microprocessor/CPU), a storage memory 32, a clock 34, and an I/O interface 36 that connects the controller 12 to the various system components illustrated in FIG. 1. An internal sensor 38 located within the controller 12 can be employed to measure the temperature, humidity levels and/or other environmental conditions occurring within the structure. In some cases, the sensor 38 may be external to the controller 12.

Figure 3:
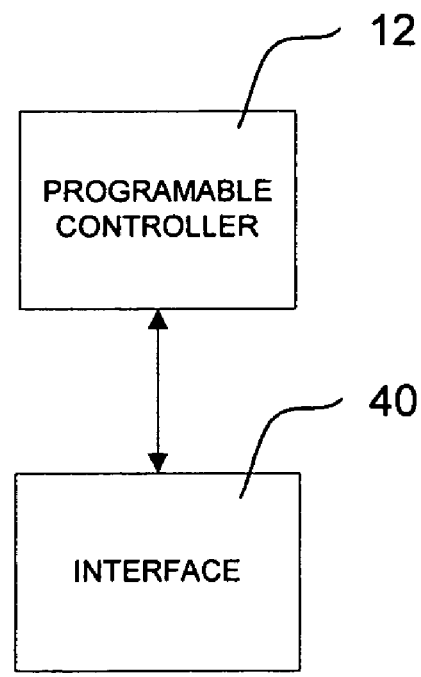
FIG. 3 is block diagram showing the controller of FIGS. 1-2 equipped with a programmable interface.

FIG. 3 is a block diagram showing the programmable controller 12 of FIGS. 1–2 equipped with an interface 40. The interface 40 may be configured to permit the manufacturer or other authorized technician to program the controller 12 to display servicing information on the user interface 40 when a fault is detected in one or more of the system components, or when the controller 12 has determined that a system component requires maintenance or other servicing. For example, the interface 40 can be used to set various equipment service event timers that can be used to remind the user to replace or clean the filter for the filtration unit 20, the pads for the humidifier/dehumidifier unit 24, the UV lamp for the UV lamp unit, the controller batteries, etc., after a certain period of time has elapsed. Other equipment service event timers may, of course, be implemented depending on the particular application.

The parameters for each equipment service event timer can be set to a particular default value, which can then be adjusted using the interface 40, as desired. When the equipment event timer elapses, the controller 12 can be configured to display a service reminder via the user interface 28 of FIG. 2 informing the user that service is suggested for the system.

The interface 40 may be provided as part of the user interface 28 described above, or may be provided as a separate interface from the user interface 28. In certain embodiments, for example, the interface 40 may include a menu or screen accessible via the user interface 28 using a security code or password. The menu or screen may be configured to permit only the manufacturer or other authorized technician or organization to program the servicing information into the controller 12, if desired.

In some embodiments, the controller 12 can be programmed at any time before, during or after the controller 12 has been installed. For example, the interface 40 may permit the servicing information to be programmed into the controller 12 in-house at the manufacturer, or at a later time during installation or servicing. In certain embodiments, for example, the interface 40 may include a data port for transferring data to the controller 12, allowing the manufacturer and/or service technician to program the servicing information into the controller 12. For example, using the data port, a service technician or manufacturer may upload servicing information into the controller 12. This information may include, for example, a logo, telephone number, email address, web page URL, etc., of a contractor, service referral organization, retailer, utility or other organization, as desired. This data may be uploaded from a PDA, laptop, or other portable or handheld device, if desired. In some cases, the logo may be in a graphical representation stored in the memory of the controller. The logo may be in, for example, bitmap, jpeg, gif, tiff, or any other suitable format.

In some embodiments, the interface 40 may be provided as part of a remote interface, allowing the manufacturer or other authorized technician to program the controller 12 at a location outside of the controller 12. In certain embodiments, for example, the interface 40 may include a receiver that can be used to receive servicing information over a wireless connection, such as an infrared connection, over a cell phone network, over a wired connection such as a telephone line, or any other suitable connection. Alternatively, or in addition, the interface 40 may be connected to the World Wide Web (WWW), which may allow the servicing information to be uploaded into the controller 12 from a remote location across the WWW.

Figure 4:
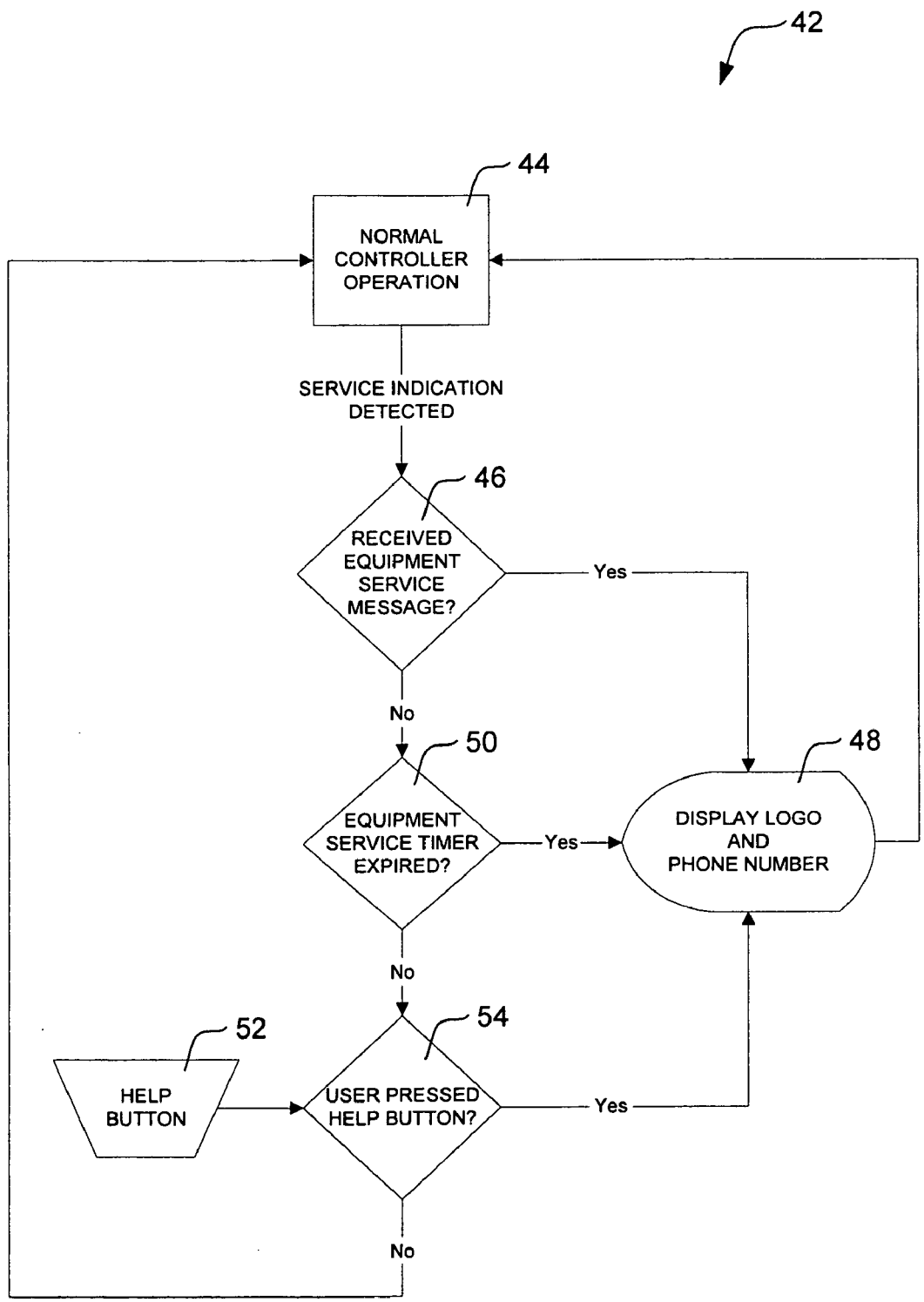
FIG. 4 is a flow chart of an illustrative service event routine programmed within a controller equipped with a service event display mode.

Referring now to FIG. 4, an illustrative service event routine programmed within a controller equipped with a service event display mode will now be described. The service event routine, indicated generally by reference number 42, may begin from a normal controller operation mode, indicated generally by block 44. From the normal controller operation mode 44, the controller may be configured to check the operating status of one or more of the system components to determine if the system components are functioning properly, as indicated generally by block 46. In some embodiments, the controller may periodically poll each of the system components and obtain current status information. If the controller receives a signal from one or more of the system components indicating a system fault, loss of power or other service indicator, the controller can be configured to display servicing information such as the name, logo, URL, telephone number and/or other information for a designated contractor, service referral organization, manufacturer, retailer, utility and/or other person or organization. The controller may also be configured to display a service event code, a description of the fault, and/or any other useful information, as indicated generally by block 48. In some cases, different servicing information can be displayed depending on which system component(s) indicated a positive service indicator. For example, one contractor logo and telephone number may be displayed if the cooling system provided a service indicator, and another contractor logo and telephone number may be displayed if the heating system provided a service indicator. The servicing information can be displayed temporarily for a certain period of time until the controller is reset and/or until the faulty system component is restored to normal operation.

If the controller does not receive a service indicator from one or more of the system components, the controller can be configured to determine whether any of the equipment service timers (if any) have elapsed, as indicated generally by block 50. If, for example, the controller determines that the filter for the filtering unit has been in use for a certain period of time and likely requires replacement, the controller can be configured display a logo and telephone number for an authorized filter contractor or dealer. Information about the type of filter to replace as well as other pertinent servicing information can also be displayed, as desired.

In certain embodiments, the controller 12 can include a help mode that can be activated by the user to obtain servicing information. As indicated by block 52, for example, the user may send a signal to the controller via a "help" button or other similar command. When the controller 12 receives a signal from the user requesting help, as indicated generally by block 54, the controller can be configured to display servicing information such as the logo, telephone number, etc. of a designated contractor, service referral organization, manufacturer, retailer, utility and/or other person or organization as desired. The controller can be configured to display the servicing information irrespective of whether a service indicator or expired equipment service event timer has been detected.

While the illustrative service event routine 42 shown in FIG. 4 includes a particular sequence of events which occur during the routine 42, it should be understood that the particular order at which each step occurs can be altered, if desired. For example, the controller may be configured to perform each step in parallel, or in a sequence different from that illustrated in FIG. 4. In addition, one or more steps in the service event routine 42 may be eliminated, if desired, depending on type of controller employed.

Figure 5:
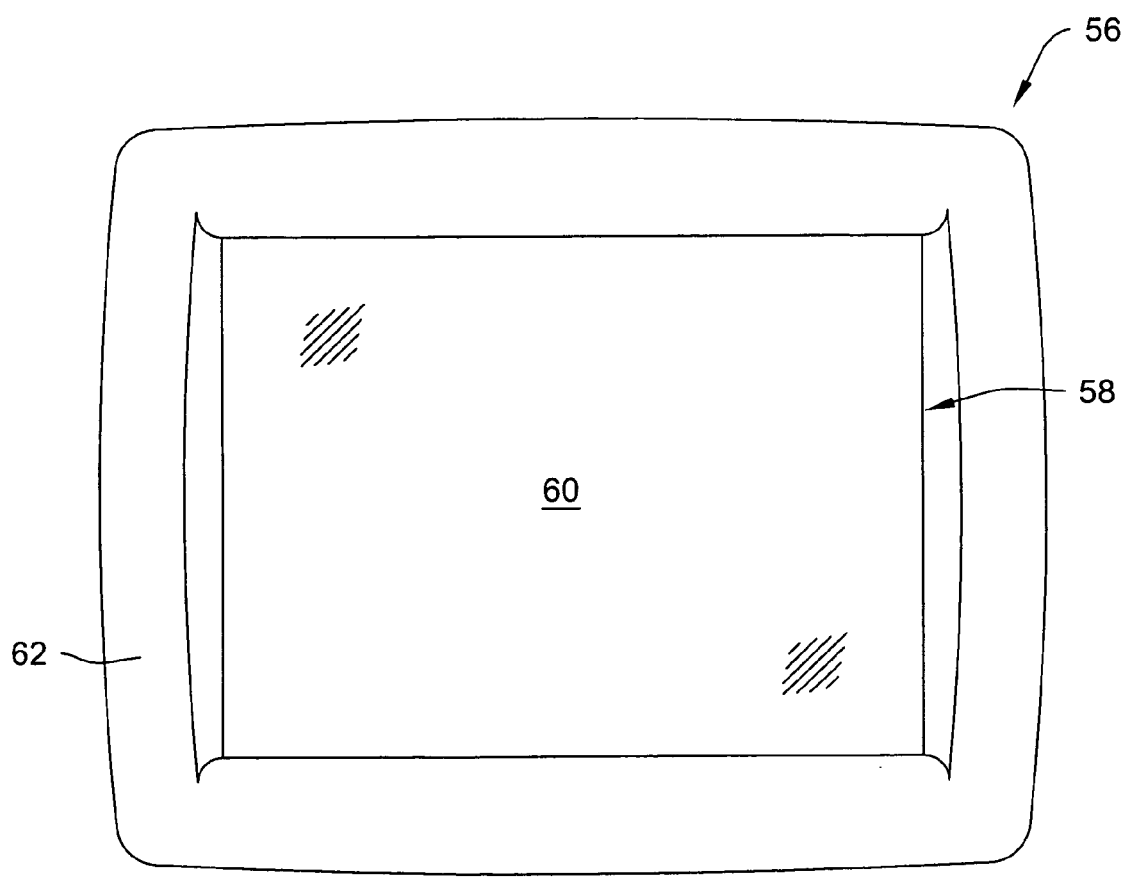
FIG. 5 is a view of an illustrative HVAC controller equipped with a touch screen interface.

FIG. 5 is a view of an illustrative controller 56 equipped with a user interface 58 for displaying servicing information when a service event is detected. In the illustrative embodiment of FIG. 5, user interface 58 includes a touch screen 60 configured to display information and transmit signals to and from the controller 56. Some examples of suitable touch screens 60 for use with the controller 56 may include resistive, capacitive, infrared or surface acoustic wave (SAW) type touch screens. The touch screen 60 may be either inset or recessed within a controller housing 62, as shown in FIG. 5, or may be provided as a separate component for use with a personal digital assistant (PDA), PC computer, or other remote device. In certain embodiments, the touch screen 60 can be provided as part of a liquid crystal display (LCD) panel, cathode ray tube (CRT), dot matrix display, or other suitable display device.

Figure 6:
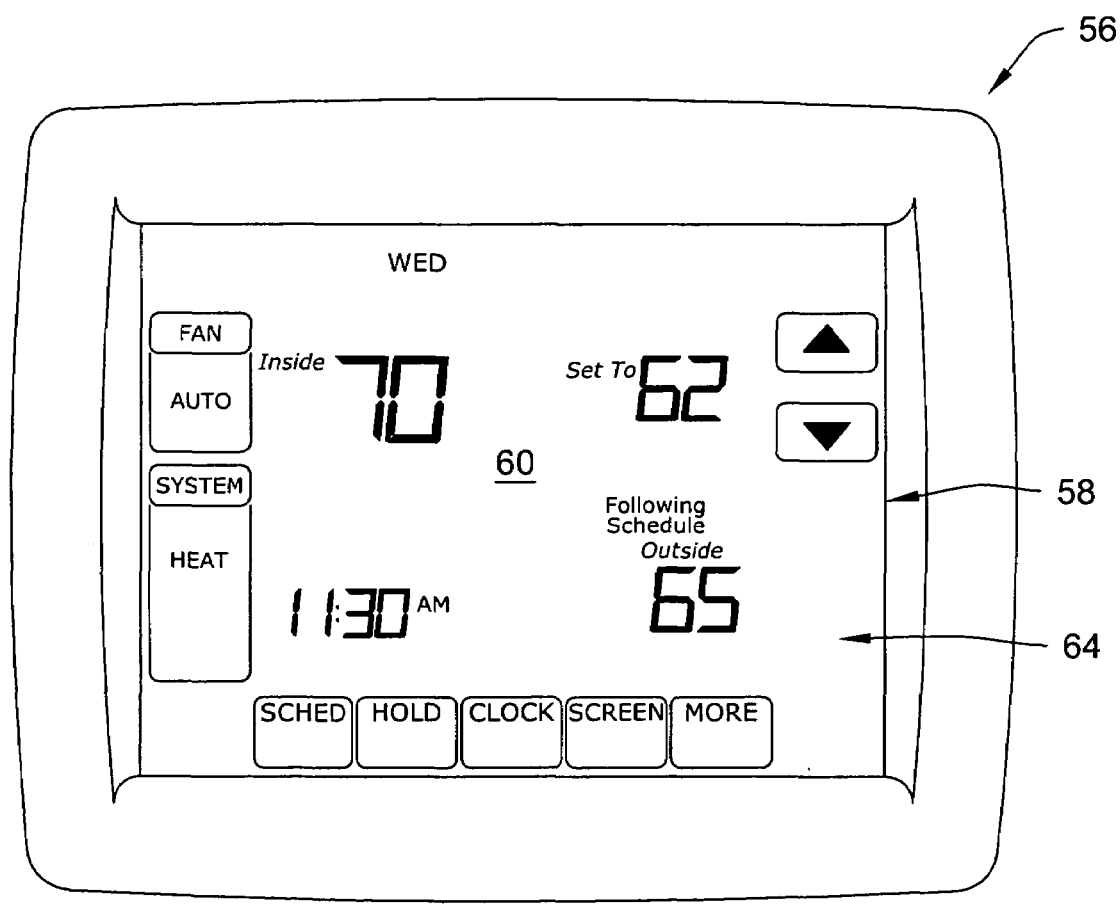
FIG. 6 is a pictorial view showing the illustrative controller and user interface of FIG. 5 during normal controller operation.

FIG. 6 is a pictorial view showing the illustrative controller 56 and user interface 58 of FIG. 5 during normal controller operation. As shown in FIG. 6, the touch screen 60 may be configured to display a main menu screen 64 that provides the user with information about the operational status of the controller 56, the current inside and outside temperature, the current time and day of week, the current heat and/or cool set point, as well as other operational information. The main menu screen 64 may be the default screen that appears on the touch screen 60 when the controller 56 is initially activated, after a loss of power has occurred, or after no activity has been detected by the user interface 58 for a certain period of time (e.g. after 1 minute of non-activity).

By pressing various icon buttons on the touch screen 60, the controller 56 can be configured to cycle through one or more menus or screens to view and, if desired, modify various operational settings within the controller 56. For example, the user can use the touch screen 60 to adjust the current temperature or humidity levels, change the clock or date settings on the controller 56, set a vacation schedule on the controller 56 that can be run while the user is away, etc. The touch screen 60 may also be used to check the status of the various system components connected to the controller 56.

Figure 7:
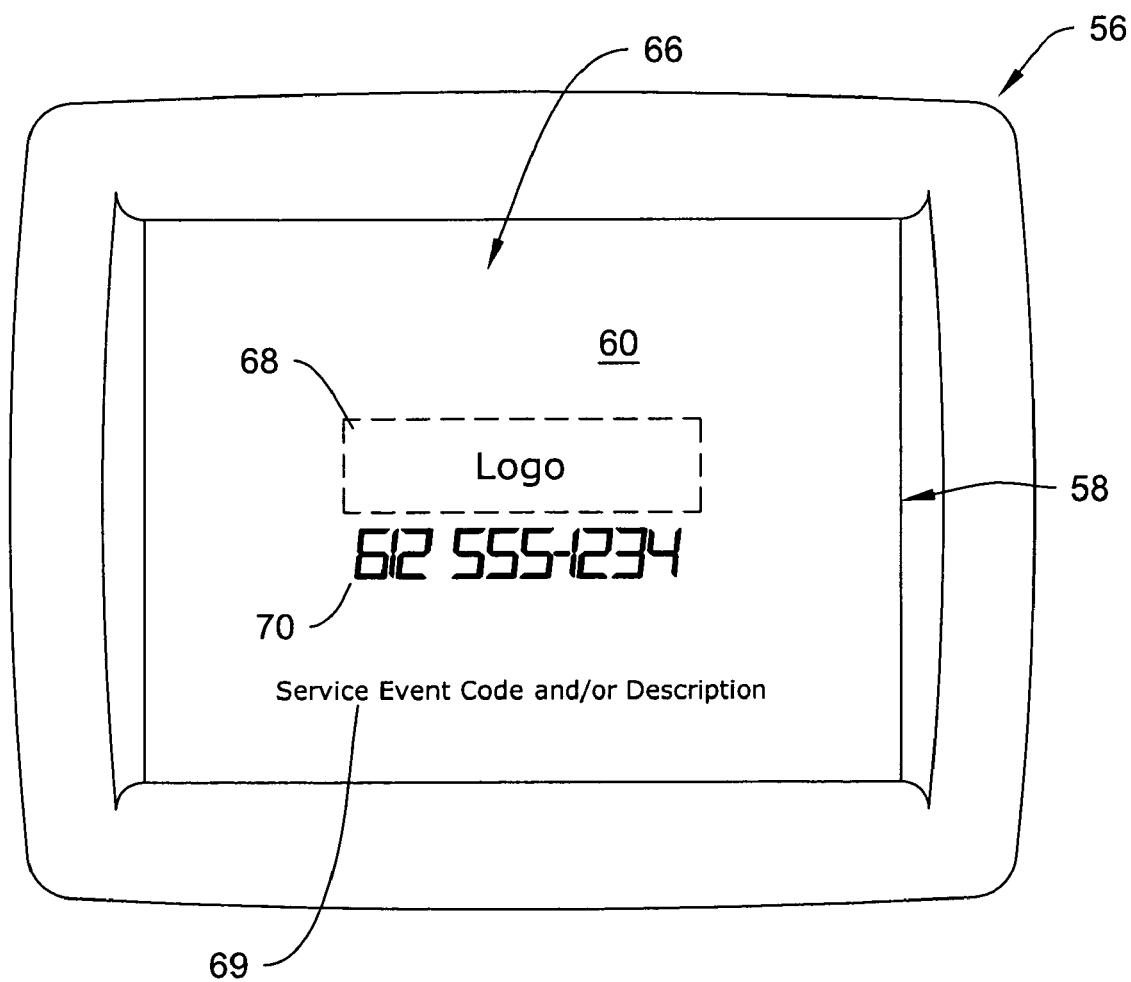
FIG. 7 is a pictorial view showing the illustrative controller and user interface of FIG. 5 after a service event has been detected.

FIG. 7 is a pictorial view showing the illustrative controller 56 and user interface 58 of FIG. 6 after a service event has been detected. As shown in FIG. 7, the controller 56 can be configured to display a service event display screen 66 on the touch screen 70 that informs the user that a service event has been detected. The service event display screen 66 may include, for example, a logo 68 and telephone number 70 indicating where to call for servicing or replacement. Other information in addition to, or in lieu of, the logo 68 and telephone number 70 may also be provided on the service event display screen 66, as desired. In some cases a service event code and/or short description of the service event may also be displayed, as shown at 69. The service event code may help a service technician diagnose the problem on the phone and possibly help provide a corrective action to the user via the phone. Also, the service event code may help the service technician determine what parts to order or bring to correct the problem.

A short description of the service event may help the user identify and possibly correct the problem. For example, if the service event was triggered as a result of the controller 56 determining that an equipment service event timer has expired, the controller 56 can be configured to display the particular device requiring service, and a recommended course of action. If, for example, an equipment service event timer for the filter has expired, the controller 56 can be configured to display the text "REPLACE FILTER" or other similar text on the touch screen 60, along with an appropriate logo, telephone number, and/or address for an authorized dealer of the filter, along with the part number of the filter, if desired. Similar messages can be displayed for other system components such as the humidifier pad, UV lamp, and batteries, as necessary.

The service event display screen 66 can be triggered when the controller 56 detects a fault in one or more of the system components, or when an equipment service event timer previously programmed in the controller 56 expires. In certain embodiments, the service event display screen 66 can be activated by the user by pressing one or more of the icon buttons on the touch screen 60, causing the controller 56 to display the desired servicing information on the screen 60.

Figure 8:
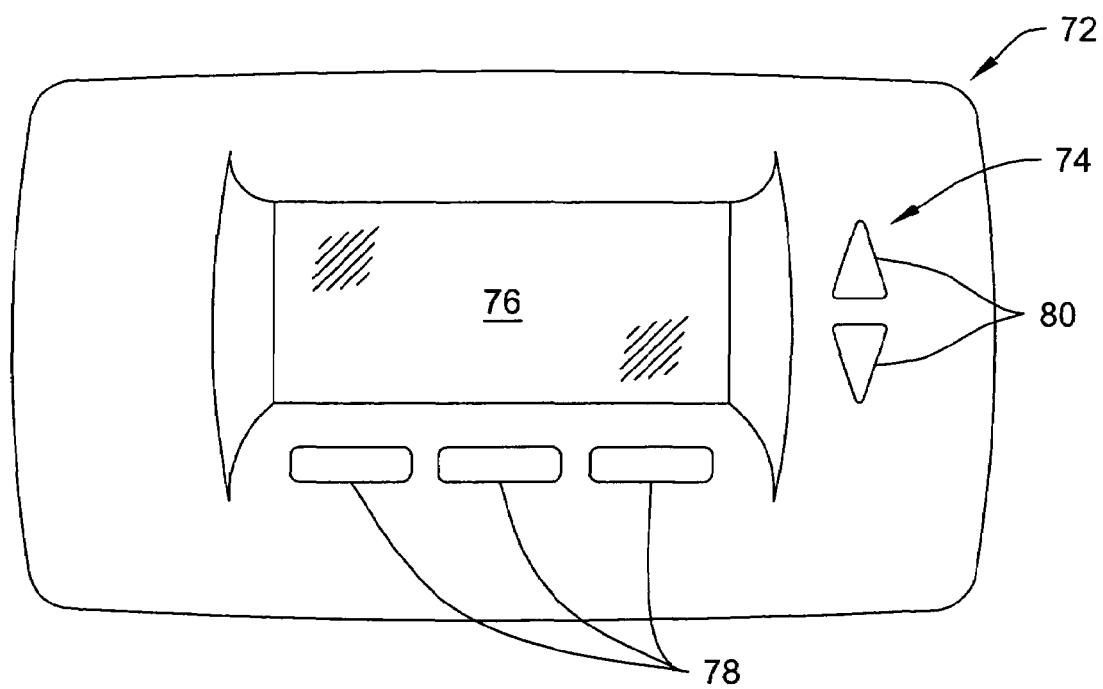
FIG. 8 is a view of another illustrative HVAC controller equipped with a display panel and keypad interface.

FIG. 8 is a view of another illustrative controller 72 equipped with a user interface 74 for displaying servicing information when a service event is detected. In the illustrative embodiment of FIG. 8, user interface 74 includes a display panel 76 and a series of buttons 78, 80 that can be pressed by the user to scroll through various menus or screens displayable on the display panel 76. The display panel 76 can include any number of suitable display devices, including, for example, a backlit LCD panel or LED screen.

Figure 9:
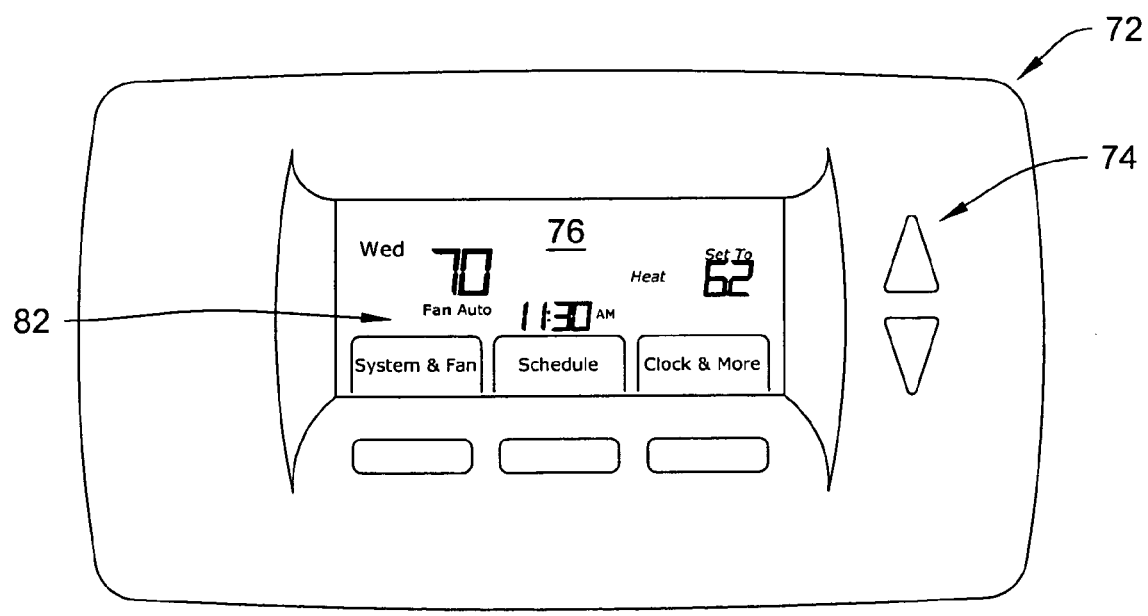
FIG. 9 is a pictorial view showing the illustrative controller and user interface of FIG. 8 during normal controller operation.

FIG. 9 is a pictorial view showing the illustrative controller 72 and user interface 74 of FIG. 8 during normal controller operation. As shown in FIG. 9, the controller 72 can be configured to display a main menu screen 82 on the display panel 76, similar to that described above with respect to FIG. 6.

Figure 10:
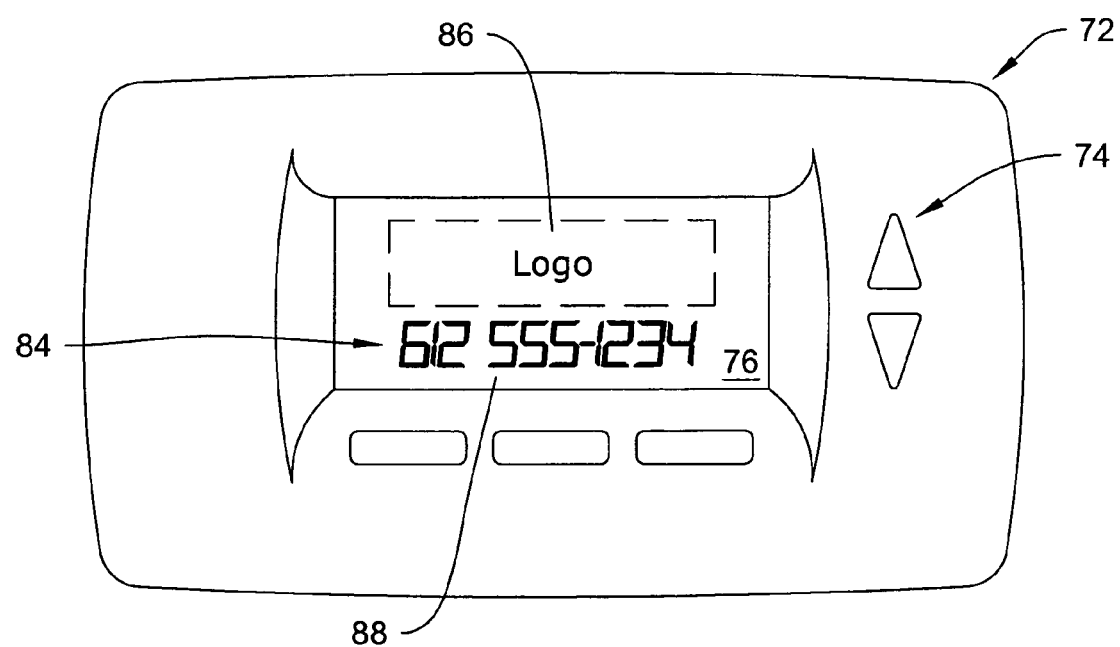
FIG. 10 is a pictorial view showing illustrative controller and user interface of FIG. 8 after a service event has been detected by the controller.

As shown in FIG. 10, the controller 72 can be configured to display a service event display screen 82 on the display panel 76 that informs the user that a service event has been detected. The service event display screen 82 may include, for example, a logo 86 and telephone number 88 indicating where to call for servicing or replacement. Other information in addition to, or in lieu of, the contractor logo 86 and telephone number 88 may also be provided on the service event display screen 84, as desired.

The service event display screen 84 can be triggered when the controller 72 detects a fault in one or more of the system components, or when an equipment service event timer previously programmed in the controller 72 expires. In certain embodiments, the service event display screen 84 can be activated by the user by pressing one of the buttons 78, 80 (e.g. a help button), causing the controller 72 to display the desired servicing information on the display panel 76.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. An HVAC controller for use in controlling one or more components of an HVAC system, the HVAC controller comprising:
 a controller configured to control one or more components of the HVAC system during normal operation of the HVAC system, said controller adapted to determine if one or more service events occurred for one or more of the components of the HVAC system, wherein said controller makes the determination without first requiring a prompting by a user of the controller; and
 a display unit configured to display servicing information when a service event is determined by the controller.

2. The HVAC controller of claim 1, wherein said servicing information includes a graphical representation of a logo.

3. The HVAC controller of claim 2 wherein said servicing information includes a telephone number.

4. The HVAC controller of claim 1 wherein said servicing information includes a service event code.

5. The HVAC controller of claim 1 wherein said servicing information includes a description of the service event.

6. The HVAC controller of claim 1, wherein said controller determines if a service event occurred by receiving a service event indicator from at least one of said one or more components.

7. The HVAC controller of claim 1, wherein said controller determines if a service event occurred by determining if an equipment service event timer expired.

8. The HVAC controller of claim 1, wherein said one or more components are one or more of a heating unit, a cooling unit, a ventilation unit, a filtration unit, a UV lamp unit, a humidifying/dehumidifying unit, a local sensor, and a remote sensor.

9. The HVAC controller of claim 1, wherein said display unit comprises a touch screen.

10. The HVAC controller of claim 1, wherein said display unit comprises an LCD panel.

11. The HVAC controller of claim 1 further comprising a data input port coupled to the controller for uploading data to the controller.

12. The HVAC controller of claim 11 wherein the controller is adapted to receive a graphical representation of a logo via the data input port, and wherein the display unit is configured to display the logo when a service event is determined by the controller.

13. The HVAC controller of claim 12 wherein the data input port is a wired port.

14. The HVAC controller of claim 12 wherein the data input port is a wireless port.

15. The HVAC controller of claim 1 wherein the controller determines if one or more service events occurred for one or more the components of the HVAC system by polling at least selected components of the HVAC system.

16. The HVAC controller of claim 1 wherein at least some of the components of the HVAC system communicate with the controller over a network.

17. The HVAC controller of claim 1 wherein at least some of the components of the HVAC system communicate with the controller via an I/O interface.

18. A programmable controller for use in controlling one or more components of a system, the controller comprising:
a controller configured to control one or more of the components of the system during normal operation of the system, said controller adapted to automatically determine if one or more service events occurred for one or more components of the system; and
a display unit in communication with the controller and configured to display a logo when a service event is determined by the controller.

19. The controller of claim 18, wherein said display unit is configured to display a telephone number when a service event is determined by the controller.

20. The controller of claim 18, wherein said display unit is configured to display a service event code when a service event is determined by the controller.

21. The controller of claim 18, wherein said display unit is configured to display a description of the service event when a service event is determined by the controller.

22. The controller of claim 18, wherein said system includes an HVAC system.

23. The controller of claim 22, wherein said one or more components are one or more of a heating unit, a cooling unit, a ventilation unit, a filtration unit, a UV lamp unit, a humidifying/dehumidifying unit, a local sensor, and a remote sensor.

24. The controller of claim 18, wherein said system includes a security system.

25. The controller of claim 18, wherein said system includes a lighting system.

26. The controller of claim 18, wherein said system includes a sprinkler or drip water system.

27. The HVAC system of claim 26, wherein said one or more components are one or more of a heating unit, a cooling unit, a ventilation unit, a filtration unit, a UV lamp unit, a humidifying/dehumidifying unit, and a remote sensor.

28. The controller of claim 18, wherein said display unit comprises a touch screen.

29. The controller of claim 18, wherein said display unit comprises an LCD panel.

30. An HVAC system, comprising:
one or more components for regulating a set of environmental conditions within a structure, and
a controller operatively connected to said one or more components and configured to control one or more of the components during normal operation of the HVAC system, said controller including display means for displaying servicing information when a service event is automatically detected by the controller.

31. The HVAC system of claim 30, wherein said servicing information includes a logo and telephone number.

32. The HVAC system of claim 30, wherein said service event comprises a service indicator from at least one of said one or more components.

33. The HVAC system of claim 30, wherein said service event comprises an expired equipment service event timer.

34. An HVAC system, comprising:
one or more components for regulating a set of environmental conditions within a structure, and
an HVAC controller operatively connected to said one or more components, said HVAC controller configured to control one or more of the components during normal operation of the HVAC system, said HVAC controller including an interface for programming a service event display mode in the HVAC controller, and display means for displaying servicing information when a service event is detected in at least one of said one or more components by the HVAC controller, wherein the HVAC controller detects a service event without having to be prompted by a user via the interface.

35. An HVAC controller for use in controlling one or more components of an HVAC system, the HVAC controller comprising:
a controller configured to control the one or more components of the HVAC system during normal operation of the HVAC system, said controller adapted to automatically determine if one or more service events occurred for one or more the components of the HVAC system; and
notifying means for notifying a service provider when a service event is determined by the controller.

36. The HVAC controller of claim 35 wherein the service provider is one of a contractor, a service referral organization, a utility, a retailer, or a manufacturer.

37. The HVAC controller of claim 35 wherein the notifying means notifies a different service provider for two different service events.

38. A thermostat for controlling an HVAC system having one or more HVAC components, the thermostat comprising;
a housing;
a display secured relative to the housing;
a controller, situated in the housing, in communication with the display;
the controller adapted to control the HVAC system; and
the controller further adapted to determine if one or more service events occurred for one or more of the components of the HVAC system without requiring prompting from a user via a user interface of the controller.

39. A method for using a thermostat to alert a user of service events that correspond to the operation of one or more HVAC components, the method comprising;
using the thermostat to monitor the operation of one or more HVAC components over the lifetime of the thermostat;
automatically detecting a service event related to the operation of one or more of the HVAC components; and
alerting the user of the detected service event via the thermostat.

40. The method of claim 39, wherein said monitoring the operation of one or more HVAC components is reoccurring or continuous.

* * * * *